United States Patent [19]

Taubitz et al.

[11] Patent Number: 5,180,778

[45] Date of Patent: * Jan. 19, 1993

[54] THERMOPLASTIC MOLDING MATERIALS BASED ON POLYPHENYLENE ETHERS AND POLYESTERS

[75] Inventors: Christof Taubitz, Wachenheim; Erhard Seiler, Ludwigshafen; Klaus Boehlke, Hessheim; Dietrich Lausberg, Ludwigshafen, all of Fed. Rep. of Germany

[73] Assignee: BASF Aktiengesellschaft, Ludwigshafen, Fed. Rep. of Germany

[*] Notice: The portion of the term of this patent subsequent to Oct. 9, 2090 has been disclaimed.

[21] Appl. No.: 574,073

[22] Filed: Aug. 29, 1990

Related U.S. Application Data

[63] Continuation of Ser. No. 209,210, Jun. 20, 1988, Pat. No. 4,962,157.

[30] Foreign Application Priority Data

Jun. 27, 1987 [DE] Fed. Rep. of Germany ....... 3721338

[51] Int. Cl.$^5$ .................... C09L 51/04; C09L 53/02; C09L 71/12
[52] U.S. Cl. ........................ 525/74; 525/68; 525/71; 525/73; 525/76; 525/77; 525/83; 525/132; 525/151; 525/166; 525/170; 525/171; 525/905
[58] Field of Search .................... 209/210; 525/68, 92, 525/74, 132, 905, 151, 167, 71, 73, 76, 83

[56] References Cited

U.S. PATENT DOCUMENTS 4,962,157 10/1990 Taubitz et al. .................... 525/60

Primary Examiner—Jacob Ziegler
Attorney, Agent, or Firm—Oblon, Spivak, McClelland, Maier & Neustadt

[57] ABSTRACT

Thermoplastic molding materials contain
A) not less than 5% by weight of a polymer component consisting of from 50 to 100% by weight of polyphenylene ethers and from 0 to 50% by weight of a styrene polymer differing from component C),
B) not less than 5% by weight of a polyester,
C) not less than 0.1% by weight of a copolymer consisting of
C$_1$) not less than 20% by weight of α-olefins of 2 to 8 carbon atoms, styrene or substituted styrenes of the general formula I

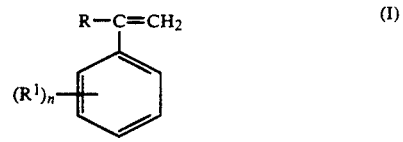

where R and R$^1$ is alkyl of 1 to 8 carbon atoms, hydrogen and/or halogen and n is 0, 1 or 2, or a mixture of these monomers,
C$_2$) not less than 0.5% by weight of a polymerizable monomer containing epoxide groups, and/or
C$_3$) not less than 0.05% by weight of a halobenzyl-containing polymerizable monomer having the structural unit (II)

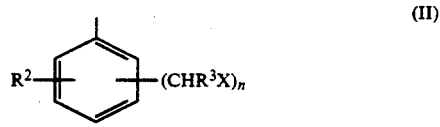

where X is halogen and R$^2$ and R$^3$ are each alkyl of 1 to 8 carbon atoms or hydrogen and n is 1, 2 or 3, and/or
C$_4$) not less than 0.05% by weight of a polymerizable monomer containing oxazoline groups, and
C$_5$) from 0 to 65% by weight of acrylonitrile, methacrylonitrile and further nonionic comonomers, and
D) from 0 to 40% by weight of a rubber impact modifier.

2 Claims, No Drawings

THERMOPLASTIC MOLDING MATERIALS BASED ON POLYPHENYLENE ETHERS AND POLYESTERS

This is a continuation of application Ser. No. 07/209,210, filed on Jun. 20, 1988 now U.S. Pat. No. 4,962,157.

The present invention relates to thermoplastic molding materials containing

A) not less than 5% by weight of a polymer component containing polyphenylene ether and B) not less than 5% by weight of a polyester.

The present invention furthermore relates to moldings which contain these molding materials as essential components.

Polyphenylene ethers have excellent thermal, mechanical and dielectric properties but are difficult to process in pure form. Blends of polyphenylene ethers and styrene polymers are also known; however, they have the disadvantage of very low resistance to solvents. Their range of use is therefore very restricted.

U.S. Pat. No. 3,819,759 describes molding materials based on polyesters, whose processibility is improved by the addition of a triaryl phosphate and a polyphenylene oxide and/or a polycarbonate. The amounts of these additives are preferably 5-15% by weight. Larger amounts of additives result in a substantial deterioration in the compatibility of the blends and hence also in the mechanical properties.

The same problem is encountered in the case of the blends of polyphenylene ethers (PPE) and polyesters, which are described in JP-A 49/75 662 (1974).

According to JP-A 57/200 447 (1982), blends of PPE and polyesters are prepared from solution; during processing in the melt, which is necessary for compounding in extruders, the two components separate again.

EP-A 148 774 describes blends of polyesters, PPE and phenoxy polymers, i.e. condensates of bisphenol A and epichlorohydrin. The mechanical properties of these blends are not completely satisfactory.

It is an object of the present invention to provide thermoplastic molding materials which, in addition to having good processibility and good thermal, mechanical and dielectric properties, are distinguished in particular by high impact strength and good heat distortion resistance without delamination occurring in moldings produced from the molding materials.

We have found that this object is achieved, according to the invention, by thermoplastic molding materials containing, as essential components, A) not less than 5% by weight of a polyphenylene ether component consisting of from 50 to 100% by weight of polyphenylene ethers and from 0 to 50% by weight of a styrene polymer differing from component C), B) not less than 5% by weight of a polyester, C) not less than 0.1% by weight of a copolymer consisting of $C_1$) not less than 20% by weight of α-olefins of 2 to 8 carbon atoms, styrene or substituted styrenes of the general formula I

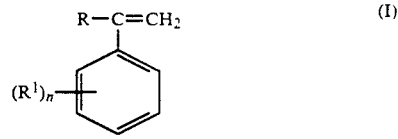

where R and $R^1$ is alkyl of 1 to 8 carbon atoms, hydrogen and/or halogen and n is 0, 1, 2 or 3, or mixtures of these, $C_2$) not less than 0.5% by weight of a polymerizable monomer containing epoxide groups and/or $C_3$) not less than 0.05% by weight of a halobenzyl-containing polymerizable monomer having the structural unit (II)

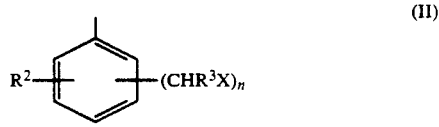

where X is halogen and $R^2$ and $R^3$ are each alkyl of 1 to 8 carbon atoms or hydrogen and n is 1, 2 or 3, and/or $C_4$) not less than 0.05% by weight of a polymerizable monomer containing oxazoline groups and $C_5$) from 0 to 65% by weight of acrylonitrile, methacrylonitrile and/or further nonionic comonomers and furthermore D) from 0 to 40% by weight of a toughening rubber.

Preferred materials of this type are described in the subclaims.

The novel thermoplastic molding materials have the advantage that they are readily processible and have good mechanical properties, high impact strength and good heat distortion resistance. In addition, no delamination is observed in moldings produced therefrom.

The component A consists of from 50 to 100% by weight of a polyphenylene ether and from 0 to 50% by weight of a styrene polymer differing from component C).

The polyphenylene ethers present in A in the novel molding materials are known per se. They are compounds based on substituted, in particular disubstituted, polyphenylene oxides, the ether oxygen of one unit being bonded to the benzene nucleus of the adjacent unit. Polyphenylene oxides substituted in the 2- and/or 6-position with respect to the oxygen atom are preferably used, and not less than 50 units are advantageously bonded to one another. Examples of substituents are halogen, such as chlorine or bromine, and alkyl of 1 to 4 carbon atoms which preferably does not have an α-tertiary hydrogen atom, e.g. methyl, ethyl, propyl or butyl. The alkyl radicals may in turn be substituted by halogen, such as chlorine or bromine, or by hydroxyl. Other examples of possible substituents are alkoxy, preferably of not more than 4 carbon atoms, or phenyl which is unsubstituted or substituted by halogen and/or alkyl. Copolymers of different phenols, for example copolymers of 2,6-dimethylphenol and 2,3,6-trimethylphenol, are also suitable. It is of course also possible to use blends of different polyphenylene ethers.

Examples of polyphenylene ethers are poly-(2,5-dilauryl-1,4-phenylene) oxide, poly-(diphenyl-1,4-phenylene) oxide, poly-(2,6-dimethoxy-1,4-phenylene) oxide, poly-(2,6-diethoxy-1,4-phenylene) oxide, poly-(2-methoxy-6-ethoxy-1,4-phenylene) oxide, poly-(2-ethyl-6-stearyloxy-1,4-phenylene) oxide, poly-(2,6-dichloro-1,4-phenylene) oxide, poly-(2-methyl-6-phenyl-1,4-phenylene) oxide, poly-(2,6-dibenzyl-1,4-phenylene) oxide, poly-(2-ethoxy-1,4-phenylene) oxide, poly-(2-chloro-1,4-phenylene) oxide and poly-(2,5-dibromo-1,4-phenylene) oxide. Preferably used polyphenylene ethers are those in which the substituents are alkyl of 1 to 4 carbon atoms, for example poly-(2,6-dimethyl-1,4-phenylene) oxide, poly-(2,6-diethyl-1,4-phenylene) oxide, poly-(2-methyl-6-ethyl-1,4-phenylene) oxide, poly-(2-methyl-6-propyl-1,4-phenylene) oxide, poly-(2,6-dipropyl-1,4-phenylene) oxide and poly-(2-ethyl-6-propyl,-1,4-phenylene) oxide.

Regarding the physical properties of the polyphenylene ethers, those having a limiting viscosity of from 0.4 to 0.7 dl/g, measured in chloroform at 30° C., are preferred.

The amount of component A) in the novel molding materials is not critical but is not less than 5, preferably from 10 to 89, % by weight based on the total weight of components A)-D). Particularly preferred molding materials are those which contain from 20 to 70, in particular from 35 to 60, % by weight of A).

The polyphenylene ethers used in component A) may be partly replaced by styrene polymers differing from component C). Examples of such styrene polymers are polystyrene, poly-α-methylstyrene and poly-p-methylstyrene, of which polystyrene is preferred. Styrene polymers prepared in the presence of from 2 to 20% by weight of an elastomeric polymer are also preferred. Rubber-like polymers based on butadiene, e.g. styrene-/butadiene polymers, polybutadiene and butadiene/styrene block copolymers are suitable. Where styrene/diene block copolymers are used, it has proven advantageous if up to 20% of the content of polyphenylene oxide are replaced by butadiene/styrene or isoprene/styrene block copolymers or their hydrogenated products.

The novel molding materials contain one or more thermoplastic polyesters as component B).

The polyesters B present in the novel molding materials are known per se. They possess chain units which contain an unsubstituted or substituted aromatic ring in the polymer chain. Examples of such substituents on the aromatic ring are halogen, such as chlorine or bromine, and $C_1$–$C_4$-alkyl, such as methyl, ethyl, propyl or butyl.

Suitable polyesters can be prepared, for example, by reacting aromatic dicarboxylic acids, their esters or their ester-forming derivatives with hydroxy compounds in a conventional manner.

Examples of aromatic dicarboxylic acids are naphthalenedicarboxylic acids, terephthalic acid and isophthalic acid as well as mixtures of these. The aromatic dicarboxylic acids or their derivatives may be partly replaced, preferably in an amount of up to 10 mol %, by other dicarboxylic acids. Aliphatic or cycloaliphatic dicarboxylic acids, such as adipic acid, azelic acid, sebacic acid and cyclohexanedicarboxylic acid, may be mentioned as examples here.

Preferably used dihydroxy compounds are glycols of 2 to 6 carbon atoms, in particular ethylene glycol, butane-1,4-diol, but-2-ene-1,4-diol, hexane-1,6-diol, hexane-1,4-diol, cyclohexane-1,4-diol, 1,4-di-(hydroxymethyl)-cyclohexane, 2,2-di-(4'-hydroxyphenyl)-propane and neopentylglycol or mixtures of these.

Preferred polyesters are polyalkylene terephthalates, which are derived from alkanediols of 2 to 6 carbon atoms. Polyethylene terephthalate and polybutylene terephthalate are particularly preferred. The relative viscosity of the polyesters is in general from 1.2 to 1.8, measured in 0.5% strength by weight solution in a phenol/o-dichlorobenzene mixture (weight ratio 3:2) at 25° C. As in the case of component A), the amount of component B) in the novel molding materials is not subject to any particular restriction, but not less than 5, preferably from 10 to 89, % by weight, based on A) to D), of the polyester are likewise used. Particularly preferred molding materials contain from 15 to 70, very particularly preferably from 25 to 60, % by weight of a thermoplastic polyester. All percentages are based on the total weight of components A) to D).

The novel molding materials contain, as a further component, not less than 0.1, preferably 0.1–50, in particular 0.1–40, very particularly 0.5–20, % by weight of a copolymer C) of $C_1$) not less than 20% by weight of α-olefins of 2 to 8 carbon atoms, styrene or substituted styrenes of the general formula I

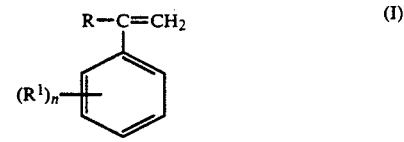

where R and $R^1$ are each alkyl of 1 to 8 carbon atoms, hydrogen and/or halogen and n is 0, 1, 2 or 3, or mixtures of these, $C_2$) not less than 0.5% by weight of a polymerizable monomer containing epoxide groups
and/or $C_3$) not less than 0.05% by weight of a halobenzyl-containing polymerizable monomer containing the structural unit (II)

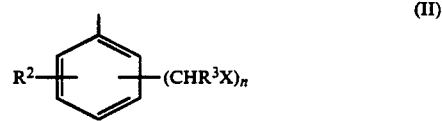

where X is halogen and $R^2$ and $R^3$ are each alkyl of 1 to 8 carbon atoms or hydrogen and n is 1, 2 or 3, and/or $C_4$) not less than 0.05% by weight of a polymerizable monomer containing oxazoline groups
and $C_5$) from 0 to 65% by weight of acrylonitrile, methacrylonitrile and/or further nonionic comonomers.

The monomers carrying epoxide groups, halobenzyl groups or oxazoline groups improve the adhesion between the components A) and B) and hence effect an overall improvement in the properties of molding materials prepared therefrom. The adhesion-improving effect is presumably based on an interaction of the epoxide, halobenzyl and/or oxazoline groups with the components A) and B). Whether this interaction results in the formation of covalent bonds or is a physical interaction cannot yet be stated with certainty.

As mentioned above, the component C) contains not less than 20, preferably not less than 70, % by weight of α-olefins of 2 to 8 carbon atoms, styrene or substituted styrenes (C₁) of the general formula I or mixtures of these monomers. In addition, up to 50% by weight of acrylonitrile and/or methacrylonitrile and other non-ionic comonomers C₅ may be present.

Copolymers which do not contain C₅ are, however, preferred.

Preferably used α-olefins are those of 2 to 6 carbon atoms, in particular ethylene or propylene, or mixtures of these.

Ethylene, styrene, p-methylstyrene and α-methylstyrene are particularly preferred as component C₁). Among the substituted sytrenes of the general formula I, α-methylstyrene and p-methylstyrene are particularly preferred, but other suitable styrenes are, for example, the various ethyl-and chlorostyrenes (m-, o- and p-), to mention but a few.

Suitable monomers C₂ containing epoxide groups are in principle all compounds which possess an epoxide group in the molecule. However, preferably used monomers are those which carry glycidyl groups, in particular glycidyl acrylate and glycidyl methacrylate. However, glycidyl derivatives of other acids and glycidyl allyl and vinyl ether are also suitable. These are generally defined by the structural unit

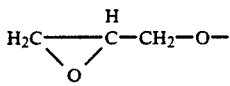

in the molecule.

Where monomers containing epoxide groups are used, the copolymers C) contain preferably from 80 to 99.5, particularly preferably from 90 to 98, % by weight of α-olefins of 2 to 8 carbon atoms, styrene and/or substituted styrene and from 0.5 to 20, particularly preferably from 2 to 10, % by weight of monomers containing epoxide groups. The amount of further copolymerizable monomers, where these are used, is preferably not more than 10, particularly preferably less than 8, % by weight.

The weight average molecular weight of the copolymers C) containing epoxide groups is in general from 20,000 to 1,000,000, preferably from 40,000 to 250,000.

In another embodiment, the copolymer C) used is a copolymer consisting of α-olefines of 2 to 8 carbon atoms, styrene and/or substituted styrenes (I) and halobenzyl-carrying monomers. For the purposes of the present invention, a halobenzyl group is understood below as being a structural unit

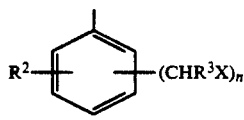

(II)

where X is halogen, preferably chlorine or bromine, in particular chlorine, n is 1, 2 or 3 and R² and R³ each alkyl of 1 to 8 carbon atoms or hydrogen. The halobenzyl groups are preferably introduced via chloromethyl-vinylbenzene (meta or para or a mixture of these isomers). However, as in the case of the compounds containing epoxide groups, only the halobenzyl group as such is critical, so that in principle all compounds which have this structural unit and are copolymerizable with C₁) are suitable.

Regarding the substituted styrenes used and the possible partial replacement by other monomers, the statements made above for the copolymers containing epoxide groups are applicable.

In a particularly preferred embodiment, the copolymer C) consist of from 80 to 99.5, particularly preferably from 95 to 99.5, % by weight of styrene and/or substituted styrene and from 0.05 to 20, particularly preferably from 0.5 to 5, % by weight of the halobenzyl-carrying monomer. The amount of further copolymerizable monomers can be up to 10% by weight, where these monomers are present.

The halobenzyl-containing copolymers C) have, as a rule, a molecular weight of from 5,000 to 1,000,000, preferably from 20,000 to 250,000, particularly preferably from 40,000 to 200,000.

In a further embodiment, the copolymer C) contains, as component C₄), one or more polymerizable monomers containing oxazoline groups.

The monomers are preferably of the general formula

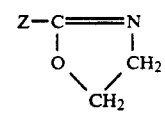

II where Z contains a polymerizable double bond.
Preferred substituents Z are

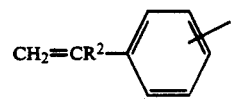

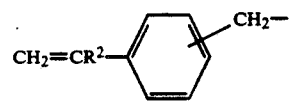

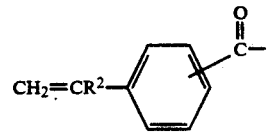

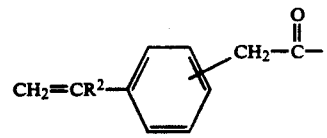

and

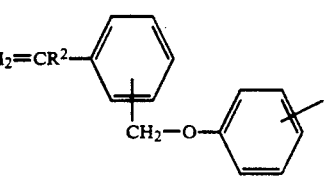

where R² is hydrogen or an alkyl or alkoxy group of 1 to 6 carbon atoms, for example methyl, isopropyl, n-propyl or butyl, to mention but a few.

Particularly preferred monomers C4) are vinyloxazolines of the general formula III

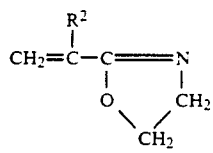

where $R^2$ has the above meanings and is preferably hydrogen or methyl.

Examples of the component C5), which can be used in amounts of up to 65, preferably up to 50, in particular up to 20, % by weight, based on C), are esters of acrylic acid and methacrylic acid with alcohols of 1 to 20 carbon atoms, acrylamides, methacrylamides, vinyl esters, vinyl ethers, acrylonitrile, methacrylonitrile and dienes, such as buta-1,3-diene and isoprene.

Examples of preferred components C are styrene/glycidyl (meth)acrylate copolymers which may contain $C_1$-$C_4$-(meth)acrylates, and ethylene/glycidyl (meth)acrylate copolymers which may contain $C_1$-$C_4$-(meth)acrylates.

The copolymers C) used according to the invention can be prepared in a conventional manner by mass, solution, emulsion or suspension polymerization, either continuously or batchwise. Preferably, the monomers are polymerized in a suitable solvent, e.g. ethylbenzene. In a particularly preferred embodiment, the monomers, e.g. styrene and chloromethylvinylbenzene, are subjected to polymerization at from 120° to 150° C. using a free radical initiator or, in particular, to thermal polymerization, i.e. in the absence of an initiator, by a continuous method under superatmospheric pressure.

The component C) may also be toughened; preferably, however, C) is not toughened. Such polymers are well known to the skilled worker as high impact polystyrene and the corresponding styrene derivatives. The polymers are prepared in the presence of a rubber impact modifier or are admixed with grafted rubbers. Examples of rubber-like polymers are polybutadiene, styrene/butadiene, styrene-b-butadiene, acrylonitrile/butadiene, ethylene/propylene, polyacrylate and polyisoprene rubbers.

These may also be used, in ungrafted form, for toughening the component A).

In this case, a rubber impact modifier D) may be added in addition to the components A) and B). Examples of such a rubber are polybutadiene rubbers, acrylate rubbers, styrene/butadiene rubbers, polybutene rubbers, hydrogenated styrene/butadiene rubbers, acrylonitrile/butadiene rubbers, ethylene/propylene rubbers, polyisoprene rubbers, styrene-grafted ethylene/propylene rubbers, thermoplastic ethylene/propylene rubbers, thermoplastic polyester elastomers, ethylene rubbers and ionomers, styrene/butadiene block copolymers, for example AB, ABA, ABA tapering and star block polymers, as well as similar isoprene block polymers and hydrogenated or partially hydrogenated block copolymers. Among these, block copolymers which contain styrene and butadiene are preferred.

Particularly preferably used rubbers are those usually employed for toughening polyesters.

Particular examples of these are graft copolymers of

D1) from 60 to 99% by weight of an elastomeric component consisting of acrylates, methacrylate and/or conjugated dienes, and, if desired, further comonomers, as the grafting base, and D2) from 1 to 40, preferably from 2 to 10, % by weight of a monomer containing epoxide groups, as the graft.

The elastomeric component (rubber component D1) generally has a glass transition temperature of less than 0° C., preferably less than −20° C. Preferably used rubber components are homopolymers of alkyl acrylates and/or alkyl methacrylates, where alkyl is of 1 to 8 carbon atoms, and/or homo- and/or copolymers of conjugated dienes, e.g. 1,3-butadiene and isoprene. A particularly preferred example is a rubber component (elastomer) consisting of polybutadiene and/or poly-n-butyl acrylate.

If desired, further comonomers, preferably vinyl aromatic monomers of not more than 12 carbon atoms, e.g. styrene or mixtures of styrene and acrylonitrile, may be used in the preparation of the elastomeric component.

Suitable components D2) are in principle all monomers which contain epoxide groups and can be grafted onto the grafting base D1).

Glycidyl derivatives, in particular glycidyl acrylates and/or glycidyl methacrylates, which are preferred because they are readily available, may be mentioned here merely as typical examples of the large number of suitable monomers containing epoxide groups.

Processes for the preparation of such graft copolymers are known per se.

The amount of the rubber impact modifier D) is not critical but is in general not more than 40, preferably from 4 to 20, % by weight, based on the total weight of the components A) to D).

The novel thermoplastic molding materials may contain conventional additives and processing assistants in effective amounts, as further component E. The amount of these is preferably not more than 50, particularly preferably not more than 20, % by weight. Heat stabilizers, light stabilizers, lubricants, mold release agents, colorants, e.g. dyes and pigments, reinforcing agents, such as glass fibers, asbestos fibers, carbon fibers or aromatic polyamide fibers, and/or fillers, such as gypsum fibers, synthetic calcium silicates, kaolin, calcined kaolin, wollastonite, talc or chalk, as well as flame-proofing agents, such as inorganic and organic phosphorus compounds, for example phosphates, phosphoric esters, phosphorous esters, phosphinic esters, phosphonous esters and organic phosphine oxides, may be mentioned here merely by way of example. Low molecular weight or high molecular weight polymers may also be present as further additives in the novel molding materials.

The novel thermoplastic molding materials are advantageously prepared by mixing the components at from 250° to 320° C. in a conventional mixing apparatus, for example a kneader, a Banbury mixer, a single-screw extruder or, preferably a twin-screw extruder. In order to obtain a very homogeneous molding material, thorough mixing is necessary. The order in which the components are mixed may be varied; two or, where relevant, three components may be premixed or all components may be mixed together.

The novel thermoplastic molding materials may be converted into moldings having good mechanical properties by injection molding or extrusion.

In what follows, percentages are by weight unless stated otherwise.

EXAMPLE 1

Molding materials according to the invention were prepared using the following components:

Component A

Poly-(2,6-dimethyl-1,4-phenylene) ether having a relative viscosity of 0.56 (measured in 1% strength by weight solution in chloroform at 30° C.).

Component B

Polybutylene terephthalate having a relative viscosity of 1.60, measured in a 0.5% strength by weight solution in a phenol/o-dichlorobenzene mixture (weight ratio 3:2) at 25° C.

Component C

C/1: Styrene/glycidyl methacrylate copolymer (95% by weight of styrene and 5% by weight of glycidyl methacrylate), prepared by continuous solution polymerization at 140° C. for a residence time of 5 hours using 10% by weight, based on total monomers, of ethylbenzene; weight average molecular weight $M_w = 95,000$.

C/2: Styrene/methyl acrylate/glycidyl methacrylate copolymer (weight ratio of monomers 85:12.5:2.5), prepared as for C/1; $M_w = 120,000$.

C/3: Ethylene/n-butyl acrylate/glycidyl methacrylate terpolymer (weight ratio of monomers 70:26:4), prepared in an autoclave at elevated temperatures and under superatmospheric pressure; melt flow index (MFI) at 190° C. and under a load of 2.16 kg (DIN 53,735) = 8 k/10 min.

C/4: Styrene/glycidyl methacrylate copolymer (96% by weight of styrene and 4% by weight of glycidyl methacrylate, prepared by emulsion polymerization of $K_2S_2O_8$ as an initiator.

Component D $D_1$): Styrene/butadiene/styrene block copolymer prepared by anionic polymerization (32% by weight of styrene and 68% by weight of butadiene) and having an $M_w$ of 110,000 (weight average).

$D_2$): A polybutadiene latex was prepared by polymerization of 60 parts by weight of butadiene in the presence of a solution of 0.5 part of tert-dodecyl mercaptan, 0.7 part of potassium $C_{14}$-alkylsulfonate as an emulsifier, 0.2 part of potassium peroxodisulfate and 0.2 part of sodium pyrophosphate in 80 parts of water at 65° C. When the polymerization was complete, the polymerization autoclave was let down; the conversion was 98%.

The mean particle size of the resulting polybutadiene latex was 0.1 μm. This latex was agglomerated by adding 25 parts by weight of an emulsion of a copolymer of 96 parts by weight of ethyl acrylate and 4 parts by weight of acrylamide (solids content of the emulsion: 10% by weight), a polybutadiene latex having a mean particle size of from 0.3 to 0.4 μm being formed. 65 parts by weight of the polybutadiene latex thus obtained were mixed with 30 parts by weight of a mixture of styrene and acrylonitrile (ratio 70:30) and 50 parts by weight of water, 0.08 part by weight of potassium sulfate and 0.05 part by weight of lauryl peroxide were added and the stirred mixture was then heated at 65° C. for 3 hours. Thereafter, 4.8 parts by weight of methyl methacrylate and 0.2 part by weight of hydroxyethyl acrylate were introduced in the course of 1 hour, without further additives, the temperature being 65° C. during the addition. The graft polymer thus prepared was precipitated from the dispersion at 95° C. with the aid of a magnesium sulfate solution, washed with water and dried in a stream of warm air.

Component E (Further Additive)

E) Polystyrene (PS 144 C from BASF, MFI 200° C./5.0 kg = 24 g/10 min).

The components A)-D) and, where relevant, E) were mixed at 280° C. in a twin-screw extruder from Werner & Pfleiderer and extruded into a water bath. After the product had been granulated, test specimens were produced by injection molding, in order to determine the impact strength and the notched impact strength (according to DIN 53,453).

The composition of the molding materials and the results of the measurements are shown in Table 1.

TABLE 1

(All amounts in % by weight)

| Example No. | A | B | C | D | E | Impact strength kJ/m² (23° C.) | Notched impact strength kJ/m² (23° C.) |
|---|---|---|---|---|---|---|---|
| 1V* | 50 | 50 | — | — | — | 15 | 0.9 |
| 2 | 45.5 | 45.5 | 9.0 C/1 | — | — | 31 | 2.8 |
| 3V* | 47.8 | 39.1 | — | 8.7 $D_1$ / 4.4 $D_2$ | — | 20 | 1.3 |
| 4 | 44.0 | 36.0 | 8.0 C/1 | 8.0 $D_1$ / 4.0 $D_2$ | — | No fracture | 8.6 |
| 5 | 44.0 | 36.0 | 8.0 C/1 4.0 C/3 | 6.4 $D_1$ / 1.6 $D_2$ | — | No fracture | 14.1 |
| 6 | 36.9 | 45.1 | 9.8 C/2 | 8.2 $D_2$ | — | No fracture | 11.7 |
| 7 | 24.0 | 56.0 | 5.6 C/2 | 10.4 $D_1$ / 4.0 $D_2$ | — | No fracture | 14.6 |
| 8V* | 33.6 | 50.4 | — | 7.6 $D_2$ | 8.4 | 32 | 3.0 |
| 9 | 34.2 | 51.3 | 6.8 C/1 | 7.7 $D_2$ | — | No fracture | 10.1 |
| 10 | 32.5 | 48.8 | 4.9 C/1 | 7.3 $D_1$ / 3.3 $D_2$ | 3.2 | No fracture | 12.1 |
| 11 | 34.4 | 42.0 | 4.5 C/4 | 13.7 $D_1$ | — | No fracture | 17.1 |

TABLE 1-continued

| | | | | | Impact strength kJ/m² | Notched impact strength kJ/m² |
|---|---|---|---|---|---|---|
| Example No. | A | B | C | D | E | (23° C.) | (23° C.) |
| | | | | 5.4 D₂ | | | |

*Comparative Examples

We claim:

1. A thermoplastic molding material consisting essentially of
   A) not less than 5% by weight of a polymer component consisting of from 50 to 100% by weight of polyphenylene ethers and from 0 to 50% by weight of a styrene polymer differing from components C) and D),
   B) not less than 5% by weight of one or more polyesters, derived from the aromatic dicarboxylic acids selected from the group consisting of the naphthalene dicarboxylic acids, terephthalic acid and isophthalic acid, which aromatic acids are replaced in an amount of 0–10 mole % by adipic acid, azelic acid, sebacic acid, or the cyclohexane dicarboxylic acids,
   C) not less than 0.1% by weight of a copolymer consisting of
      $C_1$) not less than 20% by weight of α-olefins of 2 to 8 carbon atoms, styrene or substituted styrenes of the formula

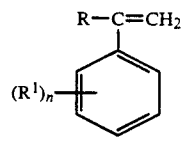

where R and $R^1$ independently of one another are each alkyl of 1 to 8 carbon atoms, hydrogen or halogen and n is 0, 1, 2 or 3, of a mixture of these monomers, and one or more of the components $C_2$) and $C_5$), where
      $C_2$) is not less than 0.5% by weight of a polymerizable monomer containing epoxide groups,
      $C_5$) is from 0 to 65% by weight of one or more monomers from the group consisting of acrylonitrile, methacrylonitrile $C_1$–$C_{20}$ esters of acrylic acid, $C_1$–$C_{20}$ esters of methacrylic acid, buta-1,3-diene, isoprene, alkylamides of acrylic acid, and alkylamides of methacrylic acid and
   D) from 4 to 20% by weight of a rubber impact modifier.

2. A molding comprising the thermoplastic molding material of claim 1.

* * * * *

UNITED STATES PATENT AND TRADEMARK OFFICE
CERTIFICATE OF CORRECTION

PATENT NO. : 5,180,778
DATED : January 19, 1993
INVENTOR(S) : Christof Taubitz et al.

It is certified that error appears in the above-identified patent and that said Letters Patent is hereby corrected as shown below:

On the title page, Item [*] Notice:,

The Terminal Disclaimer information is incorrect, should read as follows:  --[*] Notice:  The portion of the term of this patent subsequent to Oct. 9, 2007 has been disclaimed.--

Signed and Sealed this

Ninth Day of November, 1993

Attest:

BRUCE LEHMAN

Attesting Officer

Commissioner of Patents and Trademarks